United States Patent
Kopp et al.

[11] Patent Number: 6,148,850
[45] Date of Patent: Nov. 21, 2000

[54] WASHING MACHINE OUTLET BOX WITH COMMON TAILPIECE FOR TWO DRAIN OUTLETS

[75] Inventors: Raun A. Kopp, Brunswick; Michael W. Minnick, North Ridgeville; Robert S. Kane, Bayvillage, all of Ohio

[73] Assignee: Oatey Co., Cleveland, Ohio

[21] Appl. No.: 09/295,658

[22] Filed: Apr. 21, 1999

[51] Int. Cl.[7] ................................................. F16L 5/00
[52] U.S. Cl. .......................... 137/360; 137/356; 137/357
[58] Field of Search .................................. 137/360, 357, 137/356

[56] References Cited

U.S. PATENT DOCUMENTS

| | | | |
|---|---|---|---|
| 3,096,782 | 7/1963 | Williams | 137/360 |
| 3,148,698 | 9/1964 | Arnold | 137/360 |
| 3,495,276 | 2/1970 | Suess | 137/360 |
| 3,620,246 | 11/1971 | Shoquist | 137/357 |
| 3,718,154 | 2/1973 | Doumany | 137/360 |
| 3,750,697 | 8/1973 | Kump | 137/356 |
| 3,847,175 | 11/1974 | Anderson | 137/360 |
| 3,862,433 | 1/1975 | Rousselet | 307/118 |
| 3,996,959 | 12/1976 | Caruth | 137/360 |
| 4,073,018 | 2/1978 | Arrowood | 4/696 |
| 4,410,004 | 10/1983 | Kifer et al. | 137/360 |
| 4,564,249 | 1/1986 | Logsdon | 312/229 |
| 4,716,925 | 1/1988 | Prather | 137/360 |
| 4,865,072 | 9/1989 | Logsdon . | |
| 4,934,410 | 6/1990 | Humber | 137/360 |

*Primary Examiner*—A. Michael Chambers
*Assistant Examiner*—Thomas L. McShane
*Attorney, Agent, or Firm*—Renner, Otto, Boisselle & Sklar, LLP

[57] ABSTRACT

A washing machine outlet box includes a bottom wall having a first drain port for a washing machine hose and a second drain port for a condensate line. Communicating with both drain ports is a common tailpiece integral with the bottom wall. The common tailpiece includes an outlet for connection to a drain pipe and wall sections defining a first passageway from the first drain port to the outlet and a second passageway from the second drain port to the outlet. This allows both drain ports to be connected to the drain pipe with only one solvent weld between the tailpiece and drain pipe.

26 Claims, 3 Drawing Sheets

WASHING MACHINE OUTLET BOX WITH COMMON TAILPIECE FOR TWO DRAIN OUTLETS

FIELD OF THE INVENTION

The present invention relates to a washing machine outlet box that includes a common tailpiece for two drain ports in the bottom of the box, one for the washing machine drain hose and the other for a condensate line from a water softener or air conditioner or the like.

BACKGROUND OF THE INVENTION

Washing machine outlet boxes are frequently used in new construction or remodeling to provide the plumbing connections necessary for a washing machine, including water supply lines (hot and cold) and a drain port for the washing machine drain hose. The drain port usually includes a tailpiece extending downwardly from the bottom of the box for attaching a drain pipe connected to the sanitary drainage system of the building. The drain pipe may be solvent welded to the tailpiece where both are made of a suitable plastic.

Such washing machine outlet boxes may also be designed to provide a drain for a condensate line from a water softener or an air conditioner. In this manner, the drainage for both the washing machine and the condensate line may be routed through the same box. However, local construction codes typically do not permit the condensate line to drain directly into the same drain port in the box as the washing machine hose.

To accommodate a condensate line, a washing machine outlet box 30 would normally include two separate drain ports (one for the washing machine hose and one for the condensate line) and two separate tailpieces. During installation of the washing machine outlet box, a plumber is required to connect these two separate tailpieces to the drain pipe. To accomplish this, typically the upper end of a straight piece of pipe is solvent welded to the tailpiece of the washing machine hose drain port and the upper end of another straight piece of pipe is solvent welded to the tailpiece of the condensate line drain port; the lower end of one straight piece is solvent welded to the upper end of a T piece of pipe and the lower end of the other straight piece is solvent welded to the upper end of an elbow piece of pipe; the side end of the T piece and the lower end of the elbow piece are solvent welded to opposite ends of another short straight piece; and the bottom end of the T piece is solvent welded to the drain pipe. Thus, a plumber is required to make some seven solvent weld joints to connect both the washing machine hose drain port and the condensate line drain port to the drain pipe.

Additionally or alternatively, local construction codes typically require an air gap between the condensate line and the drain, necessitating that the bottom end of the condensate line be positioned above its drain port. This may require the plumber to mount a clamp either to the rear wall of the box or to a construction surface above the box to secure the condensate line in place relative to the washing machine outlet box.

Accordingly, while a washing machine outlet box that accommodates a condensate line is generally known, there remains a need for a box that can accommodate a condensate line without requiring additional installation steps to be performed by a plumber.

SUMMARY OF THE INVENTION

The present invention provides a washing machine outlet box that accommodates a condensate line as well as a washing machine drain line while minimizing the number of steps required to install the box.

More particularly, the present invention provides a washing machine outlet box comprising a housing including a bottom wall, first and second juxtaposed drain ports in the bottom wall for a washing machine drain hose and a condensate line, and a common tailpiece for both drain ports extending from the bottom wall. The common tailpiece includes an outlet for connection to a drain pipe and wall sections that define a first fluid passageway from the first drain port to the outlet and a second fluid passageway from the second drain port to the outlet. Providing a common tailpiece greatly reduces the number of joints necessary to connect the washing machine hose drain port and the condensate line drain port to the drain pipe. For example, in the preferred washing machine outlet box, only one joint is needed between the tailpiece outlet and drain pipe to connect both drain ports to the drain pipe.

The bottom wall of the box housing preferably includes an elongated opening that surrounds both drain ports. If pressure testing is to be performed, a test cap is used to cover the elongated opening. Such a test cap includes a base portion and two knockout portions that, after pressure testing, are removed from the base portion to form the drain ports. The elongated opening in the bottom wall is preferably surrounded by a non-symmetrically shaped recess and the base portion of the test cap has the same non-symmetrical shape to insure that the test cap is properly positioned relative to the opening. It may be noted, however, that if a test cap is not used, the oblong opening in the bottom wall (in conjunction with the tailpiece) may itself define the drain ports.

In the preferred test cap, the knockout portions are each sized so that the drain ports formed thereby may accommodate the washing machine drain hose. In this manner, the hose may be placed in either opening depending on the particular plumbing arrangement of the condensate line. The knockout portions preferably each include a screwdriver stop and a pull handle projecting upwardly from its top surface for convenient removal.

The common tailpiece preferably includes external wall sections defining a chamber between an opening in the bottom wall of the housing and a dividing wall section dividing the chamber into the two passageways. The top edge of the dividing wall section and the bottom surface of the test cap preferably include complementary stepped contours to insure proper positioning relative to each other. The bottom edge of the dividing wall section preferably includes a pipe stop to properly position the drain pipe within the common tailpiece.

The present invention additionally or alternatively includes a clamp assembly for securing the condensate line in alignment with one of the drain ports. The clamp assembly includes a base secured to the drain port for the condensate line, a clamp for clamping the condensate line, and a support structure cantilevering upwardly from the base for supporting the clamp at the elevated level. Preferably, the clamp is circumferentially adjustable to accommodate different diameters of condensate lines.

These and other aspects, objects, advantages and features of the present invention will become apparent as the following description proceeds.

To the accomplishment of the foregoing and related ends, the invention, then, comprises the features hereinafter fully described and particularly pointed out in the claims, the following description and annexed drawings setting forth in detail certain illustrative embodiments of the invention, these being indicative, however, of but a few of the various ways in which the principles of the invention may be employed.

DETAILED DESCRIPTION

Figure 1:
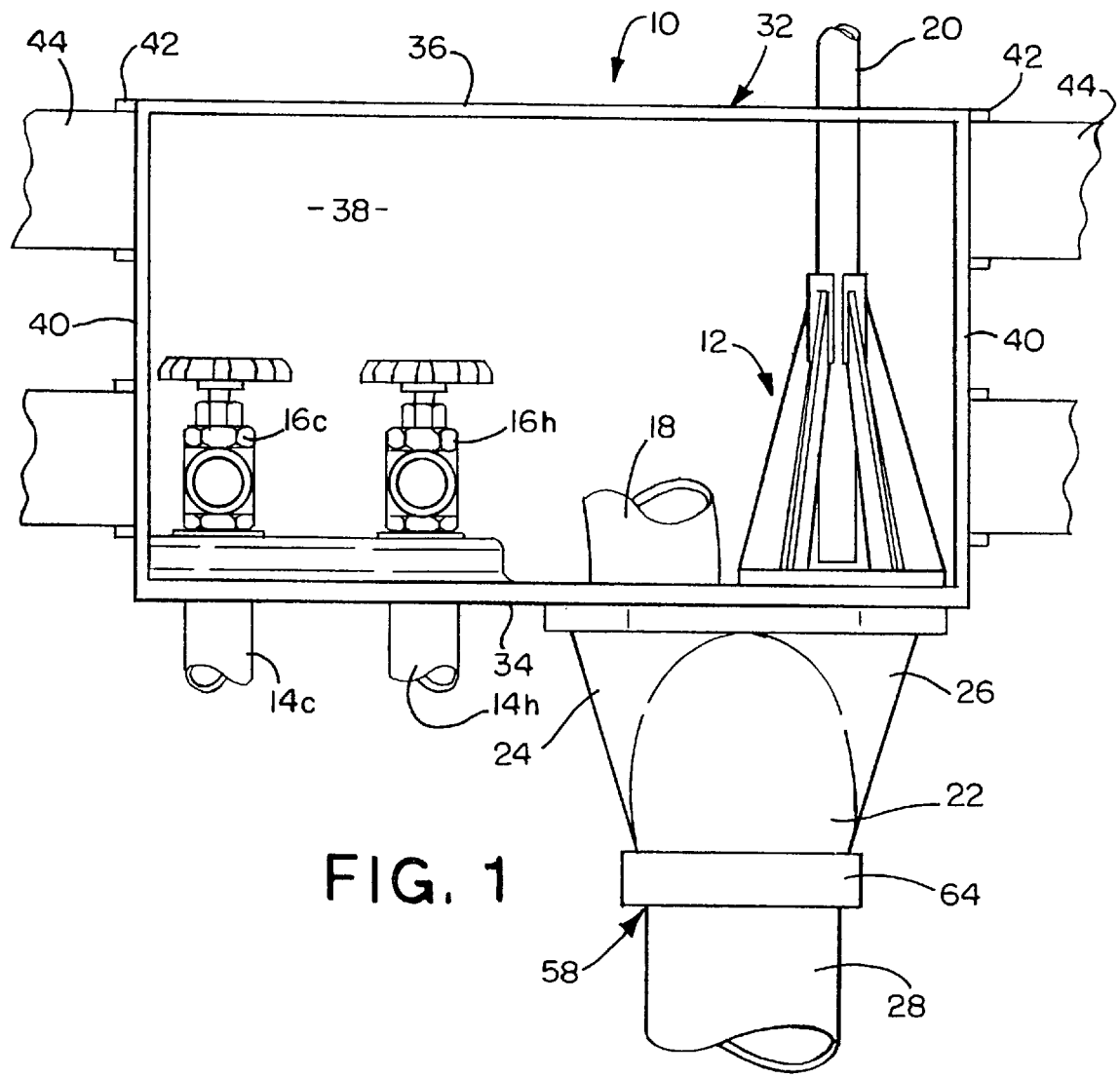
FIG. 1 is a front elevation view of a washing machine outlet box and a clamping assembly according to the present invention, the box being shown with its test cap in place and its plumbing installed.

Referring now to the drawings, and initially to FIG. 1, a preferred form of washing machine outlet box 10 and clamping assembly 12 according to the present invention are shown. The washing machine outlet box 10 accommodates the plumbing for a washing machine, namely water supply lines 14c and 14h, shut-off valves 16c and 16h, and a washing machine drain hose 18. In addition, the box 10 accommodates a condensate line 20 from a water softener or an air conditioner or the like. A common tailpiece 22 provides separate passageways 24 and 26 for the drain of the washing machine drain hose 18 and the condensate line 20, respectively, into a drain pipe 28 connected to the sanitary drainage system of the building.

The washing machine outlet box 10 is desirably molded out of a suitable plastic and includes a housing 32 having bottom and top walls 34 and 36, a rear wall 38 and side walls 40. Attached to the outer surface of each side wall 40 are loops 42 for receipt of mounting brackets 44 used to mount the washing machine outlet box 10 to studs or other structural members of a building before the wall board or other sheet material is installed to finish the wall. Once the wall material is installed, the box 10 provides a finished look for the plumbing connections to a washing machine or the like.

Figure 2:
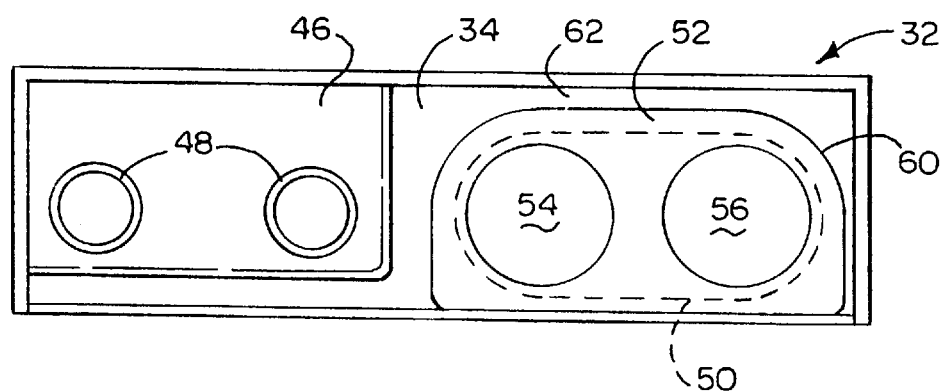
FIG. 2 is a top plan view of the bottom wall of the box of FIG. 1 prior to the condensate clamp and the plumbing being installed.

Referring now additionally to FIG. 2, the bottom wall 34 of the housing 32 includes a rectangular pedestal 46 with two circular openings 48 for the water supply lines 14 to which the shut-off valves 16 are connected. An oblong opening 50 is also formed in the bottom wall 34. A test cap 52 (shown with its knockout portions removed) covers the oblong opening 50 and defines two juxtaposed drain ports 54 and 56, one for the washing machine drain hose 18 and the other for the condensate line 20.

The tailpiece 22 is desirably integrally molded to the bottom wall 34 of the housing 32 and surrounds the oblong opening 50 whereby the separate passageways 24 and 26 extend from the drain ports 54 and 56, respectively, to the drain pipe 28. This has the advantage that only one solvent welded joint 58 is needed to connect both the washing machine hose drain port 54 and the condensate line drain port 56 to the drain pipe 28. Specifically the outlet of the tailpiece 22 is solvent welded to the upper end of the drain pipe 28. This results in a substantial reduction in the number of solvent welded joints and thus the time and effort required for a plumber to install the box 10 of the present invention when compared to prior art washing machine outlet boxes that typically require seven solvent welded joints to make the necessary connections to connect both the washing machine hose drain port and condensate line drain port to the drain pipe.

Figure 3:
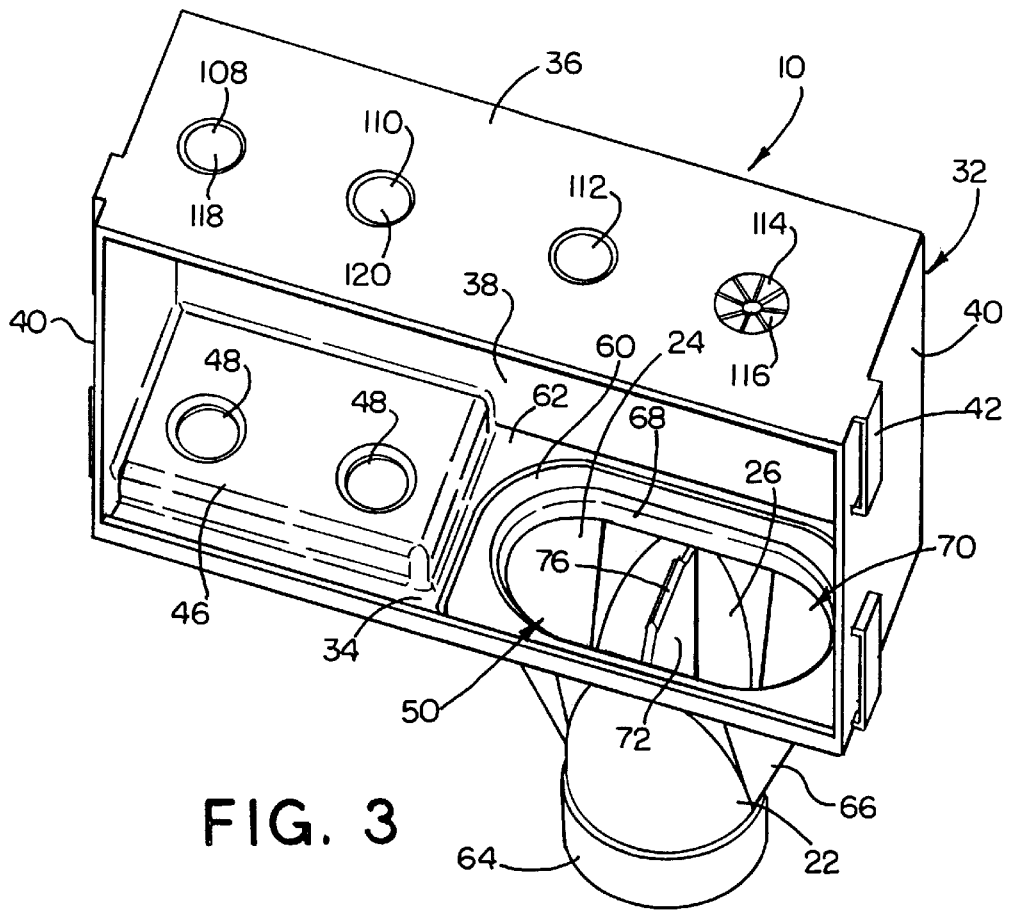
FIG. 3 is an enlarged top front perspective view of the washing machine outlet box of FIG. 1 prior to the condensate clamp and the plumbing being installed.

Referring now more particularly to FIG. 3, the washing machine outlet box 10 is shown prior to installation of the test cap 52. The oblong or elongated opening 50 is surrounded by a recess 60 in the top surface 62 of the bottom wall 34. The recess 60 has a non-symmetrical shape relative to the front and rear edges of the bottom wall 34 which, in the illustrated embodiment, is a rectangle having rounded rear corners. Also in the illustrated embodiment, the test cap 52 defines the drain ports 54 and 56. However, it should be understood that the test cap 52 may be omitted and the oblong opening 50, in combination with the tailpiece 22, may instead define the drain ports 54 and 56. In either event, both of the drain ports 54 and 56 are sized to accommodate the washing machine drain hose 18 (e.g., each may have a two inch diameter) so that the hose 18 may be inserted into either opening depending on the plumbing arrangement.

Figure 4:
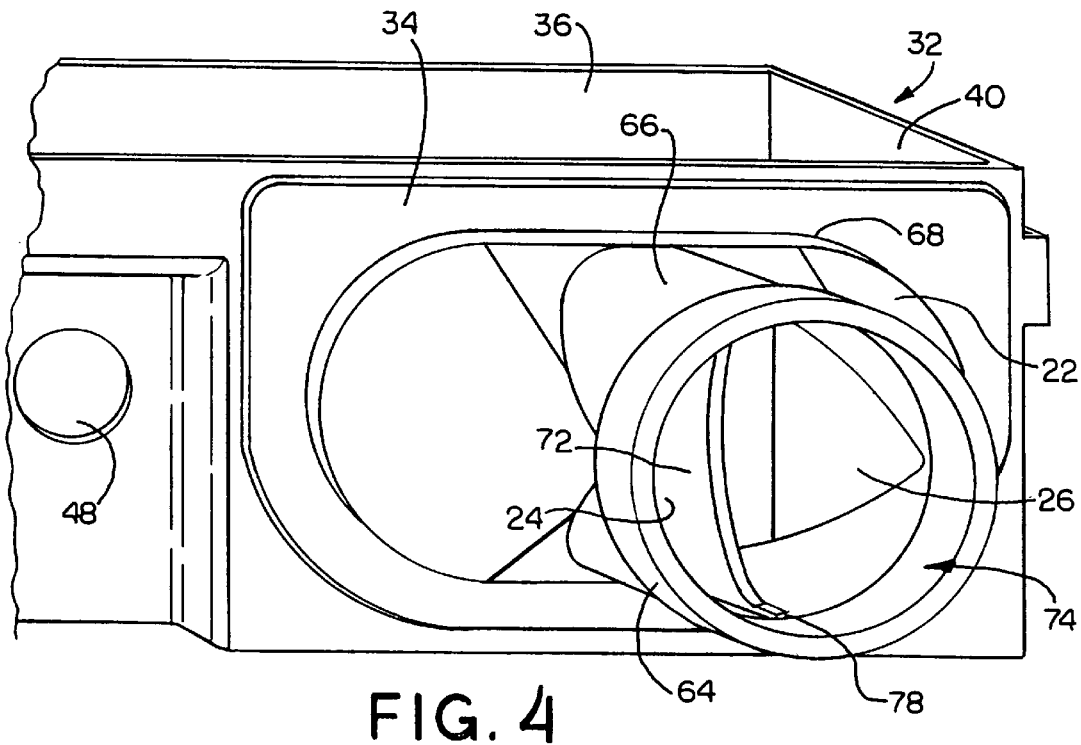
FIG. 4 is an enlarged bottom front perspective view of a portion of the washing machine outlet box of FIG. 3, including particularly the common tailpiece.

Referring further to FIG. 3 and also to FIG. 4, the tailpiece 22 is preferably integrally formed with the bottom wall 34 of the housing 32 and more preferably is formed in one piece with the bottom wall 34. However, a separate tailpiece that is, for example, solvent welded to the bottom wall 34, is possible with and contemplated by the present invention.

The tailpiece 22 includes a bottom circular flange 64 and funnel shaped wall sections 66 that extend downwardly from the wall 68 surrounding the oblong opening 50 to the flange 64. The flange 64 is the outlet of the tailpiece 22 connected to the drain pipe 28 and thus is sized (e.g., has a two inch diameter) to be directly solvent welded to a standard drain pipe. Within the upper end of the tailpiece 22 is a chamber 70 containing a dividing wall section or partition 72 that defines the passageways 24 and 26 from the drain ports 54 and 56 to the tailpiece outlet 74.

The top edge of the dividing wall section 72 has a stepped contour which, in the illustrated embodiment, is formed by a central trapezoidal-shaped step 76 (FIG. 3). The bottom edge of the dividing wall section 72 includes a pair of downward projecting tabs 78 which function as a "pipe stop" to properly position the top of the drain pipe 28 within the tailpiece 22 during installation (FIG. 4).

Figure 5:
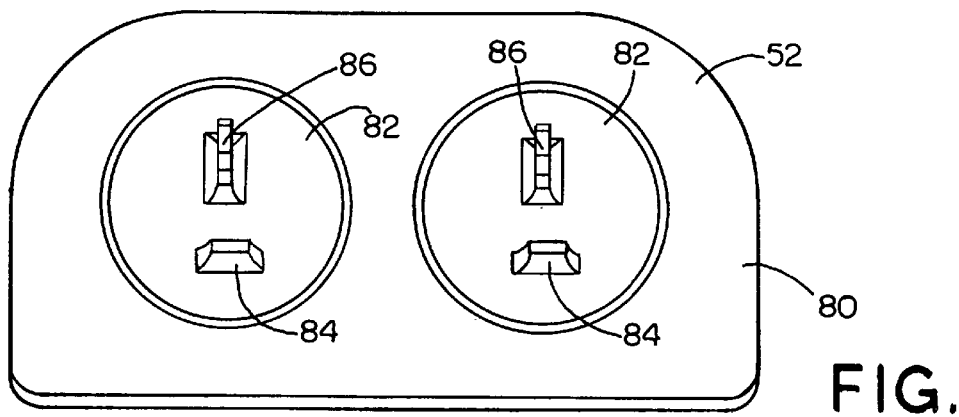
FIG. 5 is a further enlarged top front perspective view of the test cap for the box.
Figure 6:
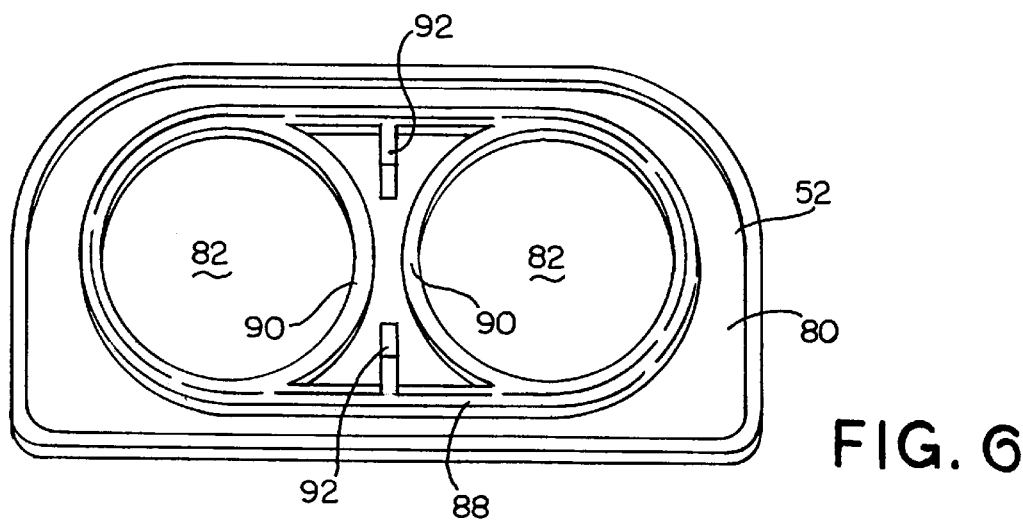
FIG. 6 is a bottom front perspective view of the test cap of FIG. 5.

Referring now to FIGS. 5 and 6, the test cap 52 is shown in detail. The test cap 52 is used to temporarily seal the drain opening 50 in the bottom wall 34 of the washing machine outlet box 10 so that pressure testing of the sanitary drainage system may be performed. To this end the test cap 52 includes a base portion 80 which is solvent welded to the bottom wall 34 and two frangible knockout portions 82 which, when removed, form the drain ports 54 and 56. The knockout portions 82 each include a screwdriver stop 84 and a pull handle 86 projecting upwardly from the top surface of the knockouts (FIG. 5). The stops 84 are located forward of the pull handles 86 so that the tip of a screwdriver may readily be placed against the stops through the open front of the box 10 and the handle of the screwdriver tapped by a hammer to break one or both knockout portions 82 out of the test cap. The base portion 80 has the same shape as the recess 60 formed on the bottom wall 34 and the non-symmetry of this shape insures that the screwdriver stops 84 are located forward of the pull handles 86.

The bottom surface of the base portion 80 includes downwardly extending webs 88, 90 and 92. The web 88 is of the same oblong shape/size as the drain opening 50 and has a complementary contour. The webs 90 each have a semi-circular shape and join with a respective curved section of the oblong web 88 to form a pair of circular rims around the knockout portions 82. The webs 92 extend centrally inward from the straight sections of the oblong web 88 and are sized/shaped to fit around the trapezoidal step 76 of the tailpiece's dividing wall section 72.

Figure 7:
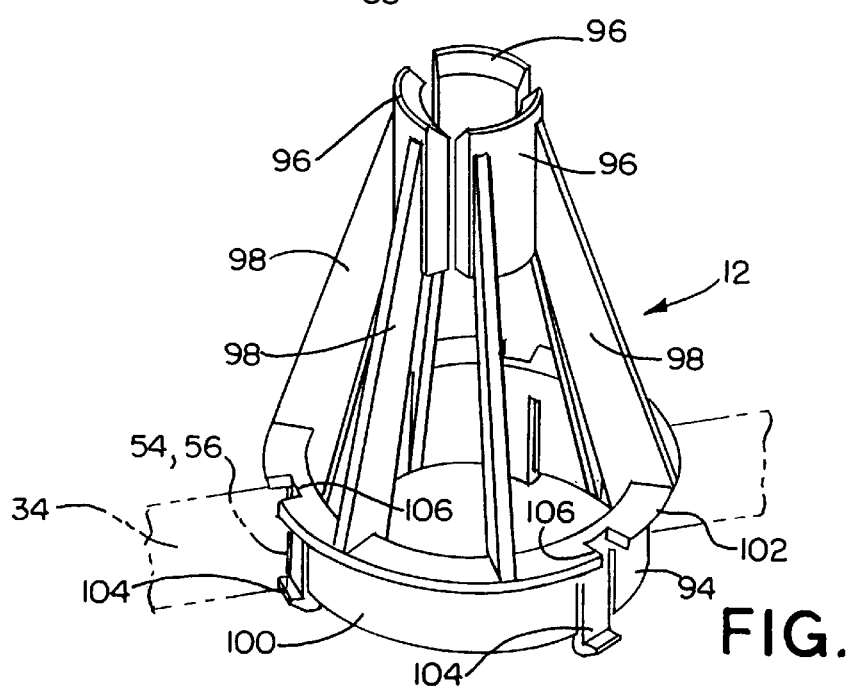
FIG. 7 is a further enlarged perspective top front view of the clamping assembly used to clamp the condensate line to one of the box drain ports.

Referring now to FIG. 7, the condensate drain clamp assembly 12 is shown separately from the washing machine outlet box 10. The clamp assembly 12 includes a base 94, clamp sections 96, and support legs 98. The base 94 is preferably designed to be secured to either of the drain ports 54 and 56 in the bottom wall 34 of the washing machine outlet box 10. The clamp sections 96 are preferably shaped so that together they form a cylindrical clamp for the condensate line 20 (FIG. 1). Pairs of support legs 98 individually support each of the clamp sections 96 at an elevated level relative to the bottom wall 34 and are preferably flexible so that they may be flexed outwardly to expand the size/diameter of the cylindrical clamp for accommodating condensate lines of different diameters. In this manner, the condensate line 20 is held in alignment with one or the other of the drain ports 54 and 56 while at the same time providing the required air gap beneath the bottom end of the condensate line 20 and associated drain port.

In the illustrated embodiment, the base 94 of the clamp assembly 12 is designed to be snap-fitted into the selected drain port 54/56. To this end, the base 94 includes a cylindrical rim 100 and a circular flange 102 extending outwardly from the top edge thereof. A series of circumferentially spaced snap tabs 104 are formed on the rim 100 and corresponding slots 106 are located on the flange 102 for accessing the snap tabs 104. (In the illustrated embodiment, three snap tabs 104 and three slots 106 are shown, these being located between every other pair of support legs 98.) To install the condensate clamp 12 to the washing machine outlet box 10, the snap tabs 104 are pressed inward to allow the rim 100 to be inserted into the selected drain port 54/56. Upon release of the snap tabs 104, rim 100 will be secured in place within the selected drain port by the flange 102 and snap tabs 104 overlying opposite ends of the selected drain port 54/56 as schematically shown in phantom lines in FIG. 7.

In the plumbing arrangement illustrated in FIG. 1, the clamp assembly 12 is secured to the right-hand drain port 56. However, the clamp assembly could instead be secured to the left-hand drain port 54 for a different plumbing arrangement. Moreover, the clamp assembly 12 could be secured to a drain opening in any washing machine outlet box that accommodates a condensate line. Also, instead of the illustrated snap-fit arrangement, the base 94 of the clamp 12 could be solvent welded to the bottom wall of a washing machine outlet box.

Referring further to FIG. 3, the top wall 36 of the washing machine outlet box 10 may include openings 108, 110, 112 and 114. One of the openings 114 may be cut in a starburst pattern forming a series of triangular flaps or fingers 116 to hold the condensate line 20 in alignment with the associated drain port 56. In this manner, condensate lines of different diameters may be accommodated and held in alignment with the associated drain port 56. The opening 112 aligned with the other drain port 54 may also have this starburst design so that the condensate line 20 may alternatively pass through this opening. The openings 108 and 110 contain knockouts 118 and 120 that would be removed for passage of the water supply lines 24 if the water lines were located above the box 10.

Although the invention has been shown and described with respect to certain preferred embodiments, it is obvious that equivalent alterations and modifications will occur to others skilled in the art upon reading and understanding the specification. The present invention includes all such equivalent alterations and modifications, and is limited only by the scope of the following claims.

What is claimed is:

1. A washing machine outlet box comprising a housing including a bottom wall, first and second juxtaposed drain ports in said bottom wall, and a common tailpiece for both of said drain ports extending from said bottom wall, said tailpiece extending completely around both of said drain ports in said bottom wall said tailpiece having an outlet for connection to a drain pipe.

2. A washing machine outlet box as set forth in claim 1 wherein said tailpiece includes wall sections defining a first fluid passageway from said first drain port to said outlet and a second fluid passageway from said second drain port to said outlet.

3. A washing machine outlet box as set forth in claim 1 wherein said tailpiece is integrally formed with said bottom wall of said housing.

4. A washing machine outlet box as set forth in claim 1 wherein said tailpiece is formed in one piece with said bottom wall.

5. A washing machine outlet box as set forth in claim 1 wherein said bottom wall of said housing has an elongated opening communicating with both of said drain ports, said tailpiece surrounding said elongated opening.

6. A washing machine outlet box as set forth in claim 5 wherein a test cap covers said elongated opening in said bottom wall of said housing, said test cap including a base portion containing two knockout portions which when removed form said first and second drain ports.

7. A washing machine outlet box comprising a housing having a bottom wall and a top wall, an opening in said top wall for a condensate line, a drain port in said bottom wall aligned with said opening in said top wall, and a clamp assembly for holding the condensate line in position relative to said drain port, said clamp assembly including a base secured to said drain port, a clamp supported at an elevated level between said bottom wall and said top wall by a support structure extending upwardly from said base.

8. A washing machine outlet box as set forth in claim 7 wherein said clamp comprises a plurality of clamp sections shaped to form a cylindrical clamp for the condensate line.

9. A washing machine outlet box as set forth in claim 8 wherein said support structure comprises a plurality of flexible legs that individually support said clamp sections thereby allowing said legs to be flexed apart for expanding the size of said cylindrical clamp.

10. A washing machine outlet box as set forth in claim 7 wherein a series of flexible flaps surround said opening in said top wall to grip the condensate line extending through said opening.

11. A clamp assembly for holding a condensate line in position relative to a drain port in a bottom wall of a washing machine outlet box comprising a base adapted to be secured to the drain port, a clamp for clamping the condensate line, and a support structure extending upwardly from said base for supporting said clamp at an elevated level relative to said base, said clamp comprising a plurality of clamp sections shaped to form a cylindrical clamp for the condensate line.

12. A clamp assembly as et forth in claim 11 wherein said support structure comprises a plurality of flexible legs that individually support said clamp sections thereby allowing said legs to be flexed outwardly for expanding the size of said cylindrical clamp.

13. A clamp assembly as set forth in claim 11 wherein said base includes a circular flange extending outwardly from an upper portion of said base and a plurality of circumferentially spaced snap tabs extending outwardly from a lower portion of said base for releasably securing said base within the drain port by said flange and said snap tabs overlying opposite ends of the drain port.

14. A washing machine outlet box comprising a housing including a bottom wall, first and second juxtaposed drain ports in said bottom wall, and a common tailpiece for both of said drain ports extending from said bottom wall, said tailpiece having an outlet for connection to a drain pipe, said bottom wall having an elongated opening communicating with both of said drain ports, said tailpiece surrounding said elongated opening, and a test cap covering said elongated opening in said bottom wall, said test cap including a base portion containing two knockout portions which when removed form said first and second drain ports, a bottom surface of said base portion including downwardly extending webs that form a pair of circular rims surrounding said knockout portions.

15. A washing machine outlet box comprising a housing including a bottom wall, first and second juxtaposed drain ports in said bottom wall, and a common tailpiece for both of said drain ports extending from said bottom wall, said tailpiece having an outlet for connection to a drain pipe, said bottom wall having an elongated opening communicating with both of said drain ports, said tailpiece surrounding said elongated opening, and a test cap covering said elongated opening, said test cap including a base portion containing two knockout portions which when removed form said first and second drain ports, said knockout portions each including a screwdriver stop and a pull handle projecting upwardly from a top surface of said knockout portions, each said screwdriver stop being located forwardly of each said pull handle.

16. A washing machine outlet box as set forth in claim 15 wherein said opening in said bottom wall is surrounded by a recess for receipt of said base portion of said test cap, said recess and said base portion of said test cap having a corresponding non-symmetrical shape for orienting said test cap in said recess to insure that each said screwdriver stop is located forwardly of each said pull handle.

17. A washing machine outlet box comprising a housing including a bottom wall, first and second juxtaposed drain ports in said bottom wall, and a common tailpiece for both of said drain ports extending from said bottom wall, said tailpiece having an outlet for connection to a drain pipe, said tailpiece including a chamber, and a dividing wall section within said chamber dividing said chamber into two passageways, one of said passageways providing fluid communication between said first drain port and said outlet, and the other of said passageways providing fluid communication between said second drain port and said outlet.

18. A washing machine outlet box as set forth in claim 17, wherein said bottom wall of said housing includes an opening covered by a test cap, said test cap including a base portion and two knockout portions that when removed from said base portion define said drain ports.

19. A washing machine outlet box as set forth in claim 18 wherein said bottom wall of said housing includes an upper surface containing a recess surrounding said opening, said recess having a non-circular contour, and said base portion of said test cap having a complementary non-circular contour for orienting said test cap in said recess.

20. A washing machine outlet box as set forth in claim 17 wherein a bottom edge of said dividing wall section includes a pipe stop for a drain pipe.

21. A washing machine outlet box comprising a housing including a bottom wall, first and second juxtaposed drain ports in said bottom wall, and a common tailpiece for both of said drain ports extending from said bottom wall, said tailpiece having an outlet for connection to a drain pipe, and a clamp assembly including a base adapted to be secured to one of said drain ports, a clamp for clamping a condensate line, and a support structure extending upwardly from said base for supporting said clamp at an elevated level relative to said base.

22. A washing machine outlet box as set forth in claim 21 wherein said base includes a circular flange extending outwardly from an upper portion of said base and a plurality of circumferentially spaced snap tabs extending outwardly from a lower portion of said base for releasably securing said base within said one of said drain ports by said flange and said snap tabs overlying opposite ends of said one of said drain ports.

23. A washing machine outlet box as set forth in claim 21 wherein said clamp comprises a plurality of clamp sections shaped to form a cylindrical clamp for the condensate line.

24. A washing machine outlet box as set forth in claim 23 wherein said support structure comprises a plurality of flexible legs that individually support said clamp sections thereby allowing said legs to be flexed outwardly for expanding the size of said cylindrical clamp.

25. A washing machine outlet box as set forth in claim 15 wherein said knockout portions are each sized to accommodate a washing machine hose.

26. A washing machine outlet box as set forth in claim 7 further comprising a series of flexible flaps surrounding said opening in said top wall to grip the condensate line.

\* \* \* \* \*